Dec. 24, 1946. W. F. WOLFNER, 2D 2,413,020
ELECTRONIC RELAY
Filed May 19, 1943

Inventor
William F. Wolfner II
by Roberts, Cushman & Woodbury
att'ys.

Patented Dec. 24, 1946

2,413,020

UNITED STATES PATENT OFFICE 2,413,020

ELECTRONIC RELAY

William F. Wolfner, II, Asbury Park, N. J., assignor to Photoswitch Incorporated, Cambridge, Mass., a corporation of Massachusetts Application May 19, 1943, Serial No. 487,671

5 Claims. (Cl. 250—27)

The present invention relates to electronic devices and especially to relays which respond to changes of the value of a detecting impedance.

Some of the principal objects of the invention are to provide a relay of the above-mentioned general type which is very sensitive and detects comparatively slight changes, such as of the order of less than 5% of the value of the detecting impedance in the input circuit, but which is sufficiently rugged to permit use in industrial installations as for example as level detector, to provide an electronic device containing a detecting bridge circuit coupled to an amplifier through a separate sensitive unbalance detector, to provide a voltage detecting circuit which reacts only to change of a controlling voltage in one direction, and to provide an electronic detecting circuit which can be regulated to react to an event to be detected with an appreciable time delay so that premature or accidental operation is forestalled.

One important feature of the invention, the above-mentioned unidirectional unbalance detector, includes potential apportioning triode and diode circuits on either side of a condenser whose charge changes with the changing controlled conductivity of the triode and affects a control potential derived from the rectifying diode. In another aspect, the invention involves conversion of a controlling alternating voltage, derived from and in phase with the voltage of a conventional supply line, into an alternating voltage of a phase in opposition to the supply phase and hence adapted to provide a blocking potential to a tube in the supply circuit.

Figure 1:
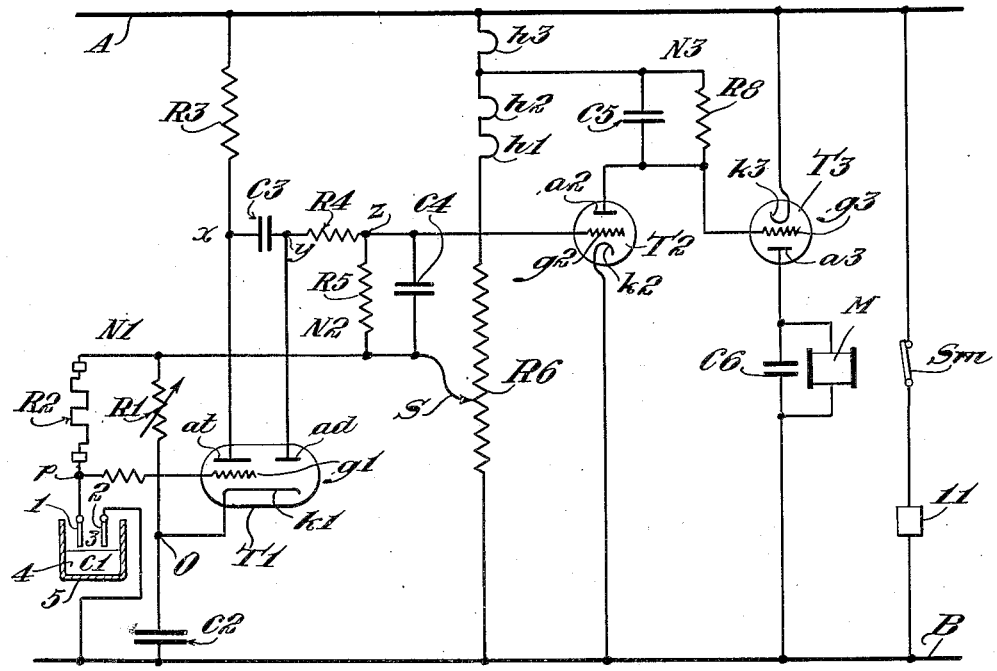
Figure 2:
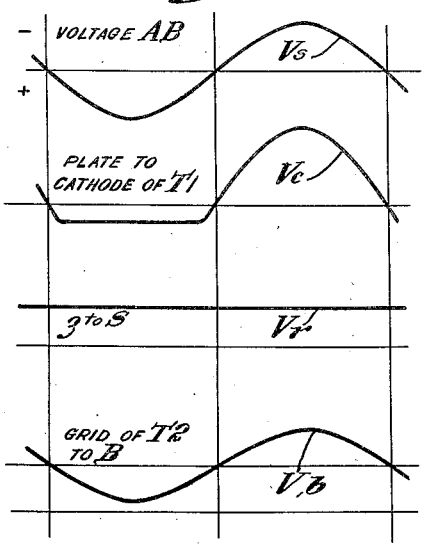
Figure 3:
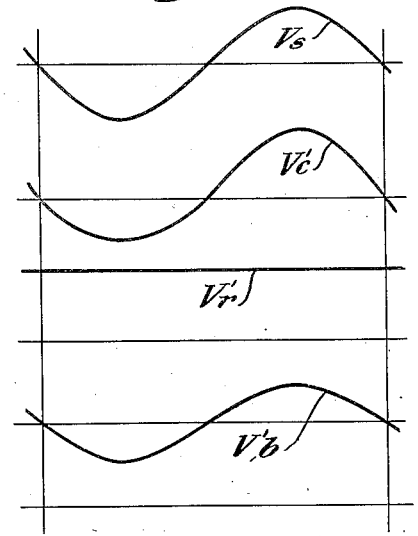

These and other objects, features and aspects will be apparent from the following description of a practical embodiment illustrating the character of the invention; this description refers to a drawing in which Fig. 1 is the circuit diagram of a level control installation incorporating the present invention; and Figs. 2 and 3 are diagrams illustrating the operation of the circuit according to Fig. 1.

Fig. 1 shows two line terminals A, B which may for example supply 60 cycle alternating current. A potentiometer R6 is connected between line terminals A and B and may be in series with the heater elements $h1$, $h2$, $h3$ of the tubes used in the circuit.

A double duty electron discharge tube T1 comprises a cathode $k1$, two anodes $at$ and $ad$ respectively, and a grid $g1$ which constitutes, with $k1$ and $at$, a conventional triode, whereas $k1$ and $ad$ form a conventional diode. It will be understood that two separate tubes, a controlled electron discharge means and an uncontrolled electron discharge means each in its individual vessel, may be used and that the tube or tubes may include conventional supplementary electrodes such as suppressors and screens.

A bridge network N1 comprises a probe condenser C1, a bridge condenser C2 and two resistors R1 and R2, one of which may be continuously adjustable and the other of the exchangeable plug-in type. The probe condenser C1 may consist of two plates 1 and 2 forming a gap 3. If the device according to the invention is used as a level detector, plates 1 and 2 will be vertically arranged so that gap 3 will contain liquid or another agent 4 confined in tank 5, when the level of that agent reaches the probes. Cathode $k1$ of tube T1 is connected to a point $o$ between condenser C2 and resistor R1, and grid $g1$ is through a limiting resistor connected to a point $p$ between condenser C1 and resistor R2. The outer terminals of condensers C1 and C2 are connected to line B, and the outer terminals of resistors R1 and R2 are connected to adjustable tap S of potentiometer R6. Plate $at$ is connected to line termbinal A in series with a load resistor R3.

The anode $ad$ of the diode portion of tube T1 is connected to a voltage combining and rectifying load network N2 comprising a capacitance means such as condenser C3 which is connected at $x$, $y$ respectively, between the two anodes $at$ and $ad$, resistors R4 and R5 connected in series between condensers C3 and tap S and a condenser C4 connected at a point $z$ between resistors R4 and R5.

An amplifier tube T2 has a cathode $k2$ connected to line terminal B, a grid $g2$ connected to point $z$ of network N2 and an anode $a2$ connected to a coupling network N3.

Network N3 comprises a load resistor R8 in parallel to a condenser C5 and connecting anode $a2$ to line terminal A.

A third amplifier tube T3 has a cathode $k3$ connected to line wire A, a grid $g3$ connected to the tube side of network N3, and a plate $a3$ connected to line terminal B through relay magnet M in parallel to a sustaining condenser C6. Magnet M may operate a switch Sm which in conventional manner controls for example a signal device 11 or a motor that drives apparatus for filling tank 5.

It should be noted that tubes T2 and T3 conduct in different directions and are related to networks N2 and N3 as follows. The conductivity of T2 depends during the half cycles when line wire A is positive, on the grid-cathode voltage of T2 which again depends on the condition of network N2. The plate current of T2 and network N3 is so selected that tube T2 carrying a certain amount of current, charges during these conducting periods condenser C5 to such a degree that the charge of C5 will, during the half cycles when line terminal B is positive, render grid $g3$ sufficiently negative to make T3 non-conductive or at least incapable of energizing magnet M to operate switch $Sm$. If now network N2 causes grid $g2$ to become more negative and hence tube T2 less conductive, condenser C5 will be charged to a lesser degree during the half cycle series when A is positive, and correspondingly $g3$ will be more positive, and T3 more conductive during the other half cycle series when B is positive, with the result that M will be energized when the cathode-grid potential of tube T2 is comparatively more negative.

This arrangement operates as follows:

It is assumed that, under normal conditions, the plate gap 3 of detecting condenser C1 is free from any agent other than the air therebetween, and that the bridge network N1 has been so balanced, by means of adjustable resistor R1, that there exists no potential difference between points o and p or cathode $k1$ and grid $g1$. Tube T1 will then carry current in its triode portion with anode $at$ positive, during the half cycles of the supply alternating current when A is positive, as indicated in Fig. 2, where $V_s$ is the supply voltage.

The plate potential of the diode portion of tube T1 with respect to cathode $k1$ is composed of the alternating component of the potential at triode anode $at$ with respect to cathode $k1$, as passed by condenser C3, and of potential components introduced into the diode circuit by network $k1$—o—R1—S—R5—R4—$ad$. During the half cycles when line terminal A is positive and tube T1 conducts, the potential at $x$ is not subject to much variation. During the other half cycles, when tube T1 is non-conductive, the potential at $x$ and therefore at $y$ changes in accordance with the line voltage. The potential at $x$ with respect to $k1$ is indicated at $V_c$ of Fig. 2. The potential at $y$ is also influenced by the voltage drop across R1, of the general shape of $V_s$, as applied in series with resistors R4 and R5. The capacity of condenser C3 is preferably chosen to be comparatively large so that no appreciable voltage drop appears across it; it acts as a coupling or boosting element and at the same time as a blocking element passing to point $y$ voltage variations appearing at point $x$ but blocking the flow of a direct current component between these points.

The resultant of these voltages is rectified in the diode portion of T1 and smoothened into a steady direct voltage by resistor R4 and condenser C4, as indicated at $V_r$ of Fig. 2. This rectified voltage between $y$ and S is added to the voltage drop across R6 which is positive when line terminal A is positive and tubes T1 and T2 are conducting, the sum of these voltages constituting the cathode-grid potential of tube T2. As indicated at $V_b$ of Fig. 2, the bias of grid $g2$ of that tube is so adjusted by means of slider S that, with bridge N1 balanced, tube T2 passes enough current to effect a voltage drop in R8 which, as above described, renders grid $g3$ of tube T3 sufficiently negative to prevent that tube from becoming conductive during the half cycles when B is positive, so that magnet M remains deenergized.

Recapitulating the condition of the circuit while bridge N1 is balanced, the triode portion of T1 is then conducting together with the diode portion, the grid-cathode voltage of tube T2 is more positive when line terminal A becomes positive, T2 is conducting, and T3 is non-conducting with M deenergized.

If now the material 4 in tank 5 rises until probe plates 1 and 2 become immersed into that material the dielectric properties of which differ from those of air, the capacity of condenser C1 will increase, and bridge N1 becomes unbalanced with a voltage appearing between cathode $k1$ and grid $g1$, which renders $g1$ negative when line terminal A is positive, so that tube T1 is now less conductive during these half cycles.

The alternating component passed by condenser C3 becomes under these conditions considerably greater than before, since there exists now a considerable plate voltage change across the triode portion of T1 during both half cycles whereas, as pointed out above, appreciable voltage change occurred previously only during those half cycles when tube T1 is non-conductive. This considerable voltage change or gradient during the conducting half cycles, together with that during the half cycles with line terminal A negative, provides a greater voltage across condenser C3. As indicated at $V_c'$ and $V_r'$ of Fig. 3, this higher voltage across C3 which counteracts the drop in resistor R5 makes more negative the voltage $V_b'$ between tap S and grid $g2$, decreases the conductivity of tube T2, and renders grid $g3$ of tube T3 more positive since condenser C5 furnishes now less counterpotential against the drop in resistor R8 during the half cycles when line terminal B is positive and tube T3 is in condition to conduct. With grid $g3$ more positive, tube T3 becomes more conductive, and magnet M is energized, operating whatever device is controlled by switch $Sm$.

By properly dimensioning condenser C5 the time interval between response of tube T3 and decrease in conductivity of tube T2 can be controlled according to well known principles; hence, by making condenser C5 comparatively large it is easily possible to avoid premature or accidental response of relay M, for example due to momentary immersion of probe plates 1 and 2 caused by splashing of liquid.

It will be noted that the present circuit responds only to unidirectional change of the detecting value, that is tube T1 will react only to change of the bridge voltage, from balance, in one direction, namely a change rendering grid $g1$ more negative. In the particular bridge circuit shown in Fig. 1, this corresponds to an increase in capacity of condenser C1. If response of the circuit to decreasing capacity is desired, the bridge may be adjusted to be normally unbalanced, so that decreasing capacity of the detecting condenser will balance the bridge. A similar result can be obtained by interchanging condenser C1 and resistor R1, in which case, however, the detecting condenser can not be grounded.

It should be understood that the present disclosure is for the purpose of illustration only and that this invention includes all modifications and equivalents which fall within the scope of the appended claims.

I claim:

1. In an electronic control device wherein a probe impedance of an alternating current bridge network affects the voltage between the control electrode and the cathode of a controlled electron discharge means having at least three electrodes, an uncontrolled rectifying electron discharge means having an anode and a cathode which is connected to said cathode of said three electrode means, a capacitance connected between said anode and the anode circuit of said three electrode means, and a load impedance in the anode circuit of said rectifying discharge means, the voltage across said capacitance and hence across said load impedance varying with varying conductivity and hence voltage variation in said anode circuit of said three electrode discharge means upon unbalance of said network, as compared with the substantially constant voltage variation in said anode circuit of said rectifying discharge means.

2. An electronic control device comprising an alternating current bridge network including a detecting impedance, a controlled electron discharge means having anode, cathode and control electrode, means associated with said network and said cathode and control element for varying the conductivity of said discharge means upon variation of said detecting impedance, an uncontrolled rectifying electron discharge means having an anode and a cathode connected to the cathode of said controlled discharge means, a condenser connected between said anodes, and a load impedance in the anode circuit of said rectifying discharge means, the voltage across said condenser and hence across said load impedance varying with varying conductivity and hence alternating voltage variation in the anode circuit of said controlled discharge means upon variation of said detecting impedance, as compared with the substantially constant voltage variation in the anode circuit of said rectifying discharge means.

3. An electronic level control device comprising an alternating current bridge network having in one of its arms condenser means including two fixed plates constituting probes with a gap therebetween adapted to be penetrated by material whose level is to be detected, a controlled electron discharge means having anode, cathode and control electrode, means for applying the output voltage of said bridge between said cathode and said control element, an uncontrolled rectifying electron discharge means having an anode and a cathode connected to the cathode of said controlled discharge means, a capacitance connected between said anodes, and a load network in the anode circuit of said rectifying discharge means, the voltage across said capacitance and hence across said load network varying with varying conductivity and hence alternating voltage variation in the anode circuit of said controlled discharge means upon unbalance of said bridge network due to change of dielectric material between said probe plates, as compared with the substantially constant voltage variation in the anode circuit of said rectifying discharge means.

4. In an electronic control device wherein a detecting impedance of an alternating current bridge network affects the voltage between the control electrode and the cathode of an electron discharge means having at least three electrodes, an electron discharge device having two anodes, a control grid associated with the first one of said anodes and a cathode common to both anodes, means associated with said network and said cathode and control element for varying the conductivity between said cathode and said first anode upon variation of said detecting impedance, a capacitance connected between the circuits of said anodes, and a load impedance in the circuit of said second anode, the voltage across said capacitance and hence across said load impedance varying with varying conductivity and hence alternating voltage variation in the circuit of said first anode upon unbalance of said network, as compared with the substantially constant voltage variation in the circuit of said second anode.

5. An electronic control device comprising a source of alternating current; a controlled circuit including potential apportioning means; a controlling circuit including a first electron discharge means having anode and cathode connected to said source and having conductivity control means, and detecting means associated with said control means for varying the conductivity of said discharge means; a second, rectifier, electron discharge means having a cathode connected to the cathode of said first discharge means and an anode associated with said potential apportioning means of said controlled circuit; and condenser means connected between said two anodes; the charge of said condenser means and hence the potential of said apportioning means of said controlled circuit varying with the current variation in said controlling circuit and hence with the effect of said detecting means.

WILLIAM F. WOLFNER, II.